Aug. 30, 1938.　　　G. Z. VON MANTEUFFEL　　　2,128,682
CONTROL DEVICE
Filed June 11, 1937
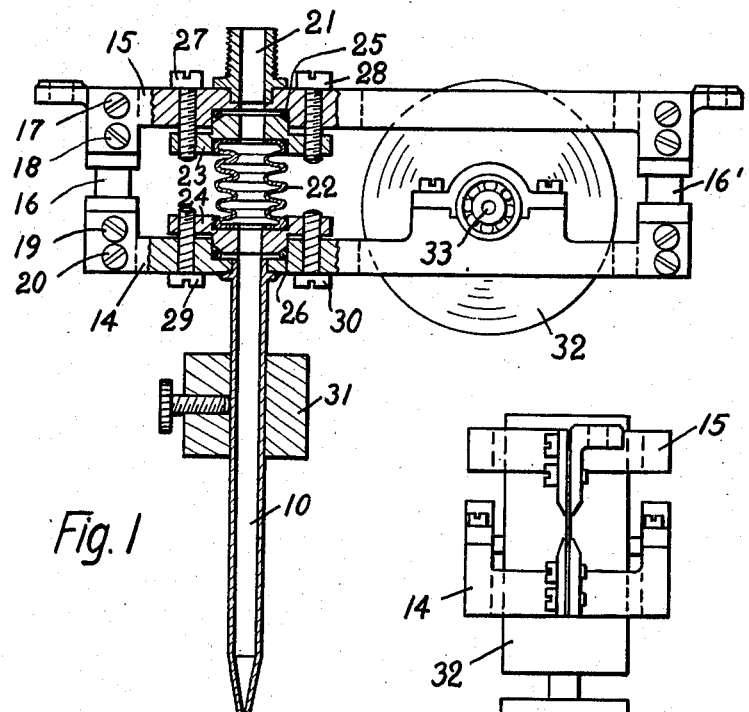
Fig. 1
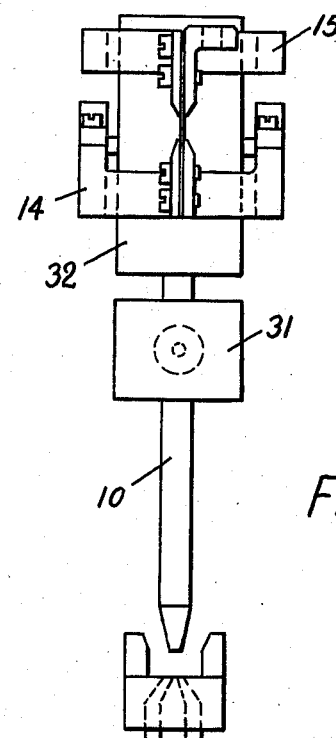
Fig. 2
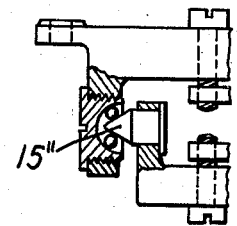
Fig. 3
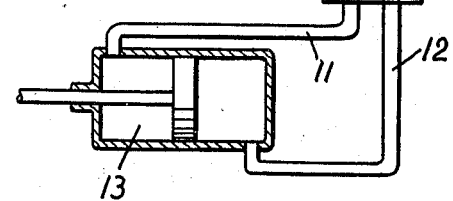
Inventor:

UNITED STATES PATENT OFFICE 2,128,682

CONTROL DEVICE

Gert Zoege von Manteuffel, Berlin-Dahlem, Germany, assignor to Askania-Werke A. G., a corporation of Germany Application June 11, 1937, Serial No. 147,794
In Germany June 15, 1936

6 Claims. (Cl. 299—73)

This invention relates to improvements in control devices in which as power relay a jet-pipe relay is used. Jet pipe relays are well known in the art and widely used in precision regulators. Specific applications of the relay are disclosed in the patent to Wunsch No. 1,620,707 dated March 15, 1927 and to Möller No. 1,900,516 dated March 7, 1933.

It is an object of this invention to provide an improved and reliable mounting for the movable jet-pipe which will not be affected by dust or other impurities.

It is a further object of this invention to eliminate the loss of pressure fluid in the supply path to the jet-pipe by eliminating nozzles or movable joints heretofore used in connection with the jet-pipe bearings.

The invention further aims at eliminating uncontrollable friction in the movable mounting for the jet-pipe and at providing simple means for normally maintaining the jet-pipe relay in a neutral position.

Further aims, objects and advantages will appear from a consideration of the description which follows with the accompanying drawing showing for purely illustrative purposes embodiments of this invention. It is to be understood, however, that the description and drawing is not to be taken in a limiting sense, the scope of the invention being defined in the appended claims.

Referring to the drawing:

Fig. 1 is an elevation of a jet-pipe and controlling members, partly in section.

Fig. 2 is an elevation of the jet-pipe control device viewed at right angles of Fig. 1.

Fig. 3 is a modified form of mounting for the movable jet-pipe.

A jet-pipe 10 is arranged opposite of and adapted to discharge pressure fluid into one or the other of reception orifices of conduits 11 and 12 for controlling the positions of a servomotor 13. The jet-pipe 10 which is mounted on a movable member 14 supported for tilting movement relatively to a fixed support 15 by means of flat springs 16 and 16' inserted in slots in said member and support and held in place by screws 17, 18, 19 and 20. The jet-pipe is thus permitted to move through its controlling range, from one reception orifice to the other, unaffected by impurities which otherwise might affect delicate bearings. If it is so desired, the stiffness of the springs 16 and 16' may be made so small that there is practically no spring-actions during the entire range of movement of the jet-pipe. The springs, as also shown in the drawing, are most suitably so arranged that the only stresses exerted on the same are tension, resulting from the weight of the movable parts, and bending stress resulting from the jet-pipe deflection.

For supplying pressure fluid to the jet-pipe there is shown a pipe coupling 21 on the fixed support communicating with a sylphon conduit 22 which may be mounted in any suitable way, such as by means of fittings 23, 24 soldered or brazed thereto and tightly held against packings 25, 26 by means of screws 27, 28, 29 and 30.

As a sylphon conduit I wish to designate a conduit of elastic thin-walled material which is yielding in axial direction and rigid in radial direction on account of concentrical or helical corrugations.

The sylphon conduit, in turn, communicates with the interior of the jet-pipe 10. Besides eliminating a loss of pressure fluid in the supply path to the movable jet-pipe, the sylphon, by virtue of its resilient action, will tend to maintain the jet-pipe in a normal inactive position in which the jet-pipe discharges an equal amount of pressure fluid into both the reception orifices. Heretofore additional springs were used for this purpose which in the novel combination can be dispensed with.

As shown in Fig. 3 in place of the flat-springs suspension conventional ball bearings 15'' may be used.

For exerting a controlling influence on the relay mechanism there is shown an adjustable pendulum in form of a weight 31 and a rotor 32 spinning on a normally horizontal axis 33 in the movable member 14.

Assuming the device be mounted on a moving object any turning movements having a component in the direction of the jet-pipe axis will cause the rotor 32 to precess and tilt the jet-pipe. Lateral accelerations will affect the pendulum 31. Other controlling influences may be made to act on the control device by applying such influences in such manner as to cause a tilt of the movable member 14 with respect to the fixed support 15. Upon a relative displacement of the jet-pipe 10 and the reception orifices pressure fluid will enter one or the other of the conduits 11 and 12 and move the servo-motor piston which may be connected to actuate a control mechanism or the like (not shown). For an example of such application reference may be had to the above cited patent to Möller No. 1,900,516.

Obviously the present invention is not restricted to the particular embodiments herein shown and described.

What is claimed is:

1. Control device comprising in combination, a fixed support; a movable member; means including at least one flat spring for tiltably mounting said member on said support; a controlling member connected to said movable member for exerting a controlling force on the same; a jet-pipe mounted on said member and adapted to discharge pressure fluid into reception orifices; and a sylphon conduit between the jet-pipe and the support for supplying pressure fluid to the same, whereby a loss of pressure fluid to the movable jet-pipe is prevented and the spring-action of the sylphon tends to maintain the jet-pipe in a normal position.

2. Control device comprising in combination, a fixed support; a movable member; means including at least one flat spring for tiltably mounting said member on said support; a gyro rotor rotatably mounted on said movable member for tilting the same by precession forces; a jet-pipe mounted on said member and adapted to discharge pressure fluid into reception orifices; and a sylphon conduit between the jet-pipe and the support for supplying pressure fluid to the same, whereby a loss of pressure fluid to the movable jet-pipe is prevented and the spring-action of the sylphon tends to maintain the jet-pipe in a normal position.

3. Control device comprising in combination, a fixed support; a movable member; means including two flat springs for tiltably mounting said member on said support, the springs being so arranged as to be subjected to tension and bending stresses only; a controlling member connected to said movable member for exerting a controlling force on the same; a jet-pipe mounted on said member and adapted to discharge pressure fluid into reception orifices; and a sylphon conduit between the jet-pipe and the support for supplying pressure fluid to the same, whereby a loss of pressure fluid to the movable jet-pipe is prevented and the spring-action of the sylphon tends to maintain the jet-pipe in a normal position.

4. In a control device a jet-pipe; a fixed support; means for movably mounting said jet-pipe on said support; and a sylphon conduit between the jet-pipe and said support for supplying pressure fluid to the same, whereby a loss of pressure fluid to the movable jet-pipe is prevented and the spring-action of the sylphon tends to maintain the jet-pipe in a neutral position.

5. In a control device a jet-pipe; a fixed support; means including at least one flat spring for tiltably mounting said jet-pipe on said support; and a sylphon conduit between the jet-pipe and said support for supplying pressure fluid to the same, whereby a loss of pressure fluid to the movable jet-pipe is prevented and the spring-action of the sylphon tends to maintain the jet-pipe in a neutral position.

6. In a control device a jet-pipe; a fixed support; two flat springs arranged in one plane for tiltably mounting said jet-pipe on said support; and a sylphon conduit between the jet-pipe and said support for supplying pressure fluid to the same, whereby a loss of pressure fluid to the movable jet-pipe is prevented and the spring-action of the sylphon tends to maintain the jet-pipe in a neutral position.

GERT ZOEGE VON MANTEUFFEL.